May 17, 1927.
F. B. SALVESEN
CULTIVATOR
Filed March 8, 1926
1,628,748
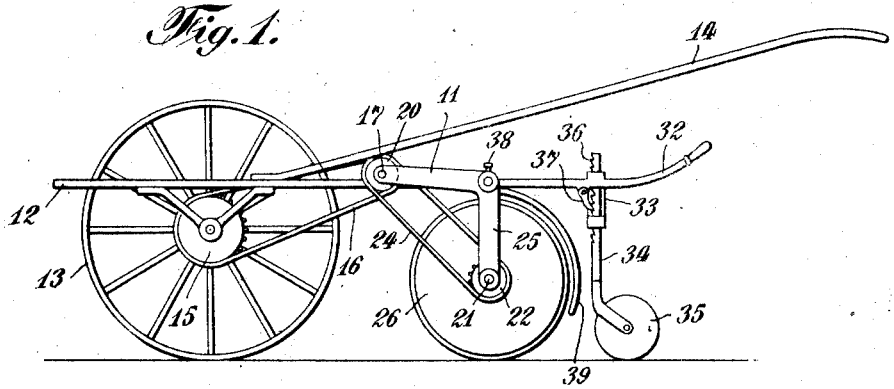
Fig. 1.
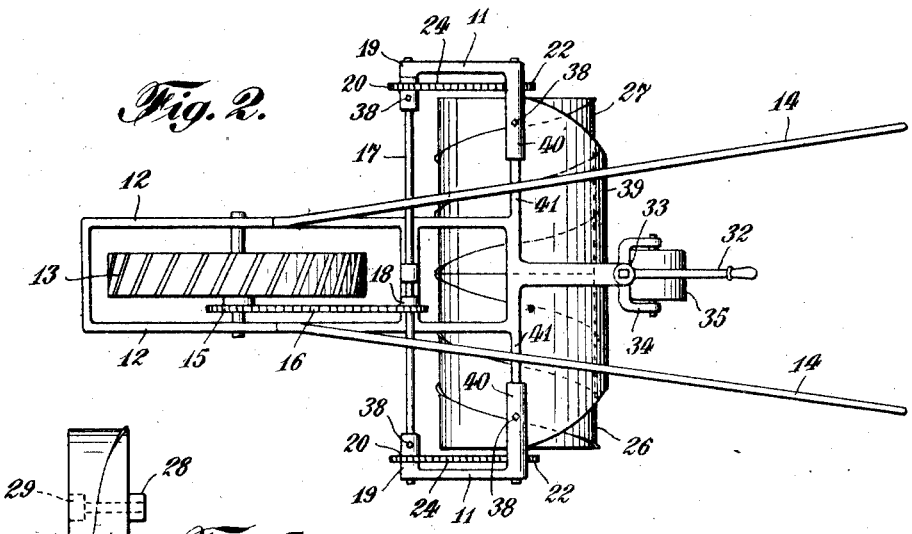
Fig. 2.
Fig. 5.
Fig. 4.
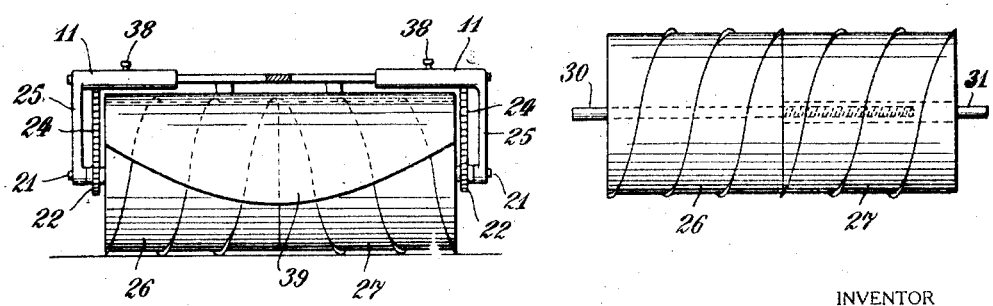
Fig. 3.
INVENTOR
Fredrik B. Salvesen
BY
Peter M. Boesen
ATTORNEY Patented May 17, 1927.

1,628,748

UNITED STATES PATENT OFFICE.

FREDRIK B. SALVESEN, OF BROOKLYN, NEW YORK.

CULTIVATOR.

Application filed March 8, 1926. Serial No. 93,085.

This invention relates to improvements in cultivators, and has for its object to produce an implement, that will prove very effective, being simple of construction and easy to adjust; and which can be manufactured at a very low cost.

The advantage of this invention will appear as the description proceeds.

With the above and other objects in view, the invention consists of the novel features of construction, combination and arrangements of parts, hereinafter fully described, claimed and illustrated in the accompanying drawings forming part of this specification, in which similar characters of reference indicate corresponding parts in all views, and in which:

Figure 1 is a side elevation of my invention; Fig. 2 is a top view of same; Figs. 3, 4 and 5 are detail sectional views.

An extensible frame is indicated by 11; said frame having a front part 12 adapted to carry a large front wheel 13. To said front part are rigidly attached two steering arms 14; while the axle of the front wheel is provided with a sprocket wheel 15 adapted to bring said wheel in contact with a transmission drive, by means of a chain 16; said chain acts as a transmitter of motion from said sprocket to a rotatable axle 17, having rigidly attached thereto a sprocket wheel 18 adapted to receive said chain. The axle 17 is rotatably connected to one side of the frame 11 as shown at 19, and has at its end small sprocket wheels 20 for further transmission of the motion by means of chains 24 to an axle 21, having sprockets at both ends as at 22, for said purpose. The extensible frame members, as illustrated by 40 and 41, are capable of sliding towards or away from one another, thereby yielding the space necessary for increasing the number of drum sections when required. The bars of the frame may be of any shape desired and said frame when properly adjusted is kept in the desired position by means of set-screws 38.

The carriage or frame has at each side a downwardly extending bracket 25, adapted to receive and carry the axle of the drum, as clearly shown in Fig. 3. The drum has a deeply threaded surface in the shape of a screw and is composed of several sections 26, 27, a small section is shown in Fig. 5. These sections may be combined, according to their threaded surface, to plough or throw the soil or earth one way, or they may be combined to throw or heap the earth in two or more ways as will clearly be understood from the illustrations shown. For protection a mudguard 39 is attached to the frame at the rear of the drum.

The different sections of said drum are provided with a tenon 28 and a mortise 29, as shown in Fig. 5, for connecting such sections together, and the number of sections are held firmly by an axle comprising two sections 30 and 31, of which one, 31, has a cylindrical threaded hole adapted to receive the other section, when screwed thereinto; thereby permitting the regulation of the length of said axle according to the number of drum sections inserted.

The carriage, or frame 11 has a rear projection 32 made to form a regulation bar and having a clutch 33 embracing a forked bar 34, carrying a supporting wheel 35. The latter bar which is of a substantially rectangular shape has one side of its upper part provided with notches 36, adapted to engage with a pawl 37, pivoted to said clutch, thereby regulating the height and tension of said drum.

While I have shown and described the preferred embodiment of my invention, it is to be understood that many minor modifications may be resorted to within the scope of the invention, and I do not, therefore, desire to be limited to the precise construction illustrated in the drawings.

Having thus fully described my invention, what I desire to claim and protect by Letters Patent is:

1. A cultivator, as described, having an extensible axle adapted to receive a plurality of cylindrical drum sections, said sections having their outer surfaces provided with deeply cut spiral ridges wound in a screw-threaded manner, and adapted to be reversely connected, and means for combining said sections into one integral unit mounted on said axle.

2. In a cultivator, as described, a drum comprising a plurality of cylindrical sections, each being provided upon their outer surface with spiral ridges wound in a screw-threaded manner, and inserted on an extensible axle, said sections being formed at their abutting ends with tenons and mortises, respectively, for the purpose of securing said sections tightly together when mounted upon said axle.

In testimony whereof, I have hereunto affixed my signature.

FREDRIK B. SALVESEN.